United States Patent [19]

Peters et al.

[11] Patent Number: 4,510,116
[45] Date of Patent: Apr. 9, 1985

[54] APPARATUS AND METHOD FOR BLOW MOLDING

[75] Inventors: Donald L. Peters; John R. Rathman; Irvin L. Sumpter, all of Bartlesville, Okla.

[73] Assignee: Phillips Petroleum Company, Bartlesville, Okla.

[21] Appl. No.: 517,604

[22] Filed: Jul. 27, 1983

[51] Int. Cl.³ .............................................. B29C 17/07
[52] U.S. Cl. .................................... 264/529; 264/531; 264/534; 425/525; 425/530; 425/532
[58] Field of Search ............. 425/522, 525, 530, 532; 264/523, 529, 531, 534

[56] References Cited

U.S. PATENT DOCUMENTS 3,736,201  5/1973  Teraoka .................... 264/529 X

FOREIGN PATENT DOCUMENTS 1587186  3/1970  France ........................... 264/529
49-41111  11/1974  Japan ............................ 264/531

Primary Examiner—Jan Silbaugh

[57] ABSTRACT

In blow molding an article with a reverse fold, a profiled bar is positioned where the parting line of the mold is to be when the mold is closed. The bar provides a reverse fold in the plastic article during a pre-blow step. In operation, a pre-pinched parison is formed adjacent the bar and as the mold begins to close a small amount of pre-blow air is introduced into the parison folding it against and over the bar. After the mold is closed, blow air is introduced to form the part. A complex part with good wall distribution of material can be obtained by this method.

10 Claims, 6 Drawing Figures

APPARATUS AND METHOD FOR BLOW MOLDING

BACKGROUND OF THE INVENTION

In one aspect, the invention relates to an apparatus suitable for forming a blow molded article. In another aspect, the invention relates to a method for blow molding a plastic article.

Blow molding processes are widely used to form hollow articles from plastic materials. Generally, a parison, which is a tube-shaped blank of molten plastic material is extruded from a nozzle having a generally annular opening defined between a die ring and land and is directed by gravity to between the parts of an opened mold. When a desired length of parison has been extruded, the mold is closed and compressed gas, usually air, is injected into the parison to pneumatically expand it to fit the inside contours of the mold.

When hollow articles having a cross section differing substantially from the circular are to be blow molded, the sides of the circular cross section parison are expanded to different degrees so there occurs a thinning of the plastic material as the parison is stretched. Localized weaknesses and flaws in blow molded articles thus sometimes occur where the parison has been called on to stretch too great an extent. This problem is especially severe where the blow molded article is to have sharp corners.

Another type of hollow article which is difficult to satisfactorily blow mold is one having inwardly directed indentions or folds. It is very difficult to achieve satisfactory wall distribution around the sides of the indention in the blow molded part. Blow molded parts having unacceptably thin spots in the walls or ruptures were commonplace. One attempt to alleviate this problem involves extruding a thicker walled parison, where the greater wall thickness may be localized if desired by shaping the die ring and/or land. While this approach provides some benefits processes for controlling wall thicknesses without using larger amounts of material would clearly be very desirable.

OBJECTS OF THE INVENTION

It is an object of this invention to provide an apparatus for forming a blow molded article having an inwardly directed fold.

It is a further object of this invention to provide a method for blow molding a plastic article having an inwardly directed fold.

It is a further object of this invention to provide a method and apparatus for blow molding an article having an inwardly directed fold which is light in weight and reliably formed with good distribution of material in its walls.

SUMMARY OF THE INVENTION

In one aspect, an apparatus is provided which comprises a means for extruding a molten tubular parison into a closeable mold. The apparatus is provided with a means for pinching closed one end of the tubular parison prior to closing the mold. A means for pneumatically expanding the parison can then be actuated to cause the parison to begin expanding prior to closing the mold. The closeable mold, when it is in the closed position, defines a chamber which has at least one longitudinally extending rib protruding inwardly from the sidewall of the chamber. The chamber is defined by a first mold part which determines the rib. The first mold part has a first face and a second face. A second mold part determines a first side portion of the chamber. The second mold part has a first face and a second face also. A third mold part determines a second side portion of the chamber and it has a first face and a second face as well. The first face of the first mold part matches with the first face of the second mold part and the second face of the first mold part matches with the first face of the third mold part. The device is also provided with a means for forming a closure between the second face of the second mold part and the second face of the third mold part. There is also provided a means for moving the second mold part into a position so that the first face of the second mold part matches with the first face of the first mold part and also a means for moving the third mold part into a position so that the first face of the third mold part matches the second face of the first mold part.

According to another aspect of the invention, there is provided a method for blow molding a plastic article from a parison by extruding the molten parison from between a die and a land along the side of an elongated rib. The rib is preferably fixedly mounted and is to be positioned along the parting line of a pair of mold parts to form a chamber having an inwardly protruding rib. The open end of the parison is pinched shut. The parison can then be pneumatically expanded partially around the elongated rib so that the rib determines an inwardly directed fold in the parison. The mold parts are then moved into contact with the elongated rib and a flash line of the parison becomes pinched between the elongated rib and the mold parts, assuring good distribution of material around the rib. The parison is then pneumatically expanded by the internal application of compressed gas to fit the chamber determined by the mold parts and the elongated rib and result in the formation of the desired article.

DETAILED DESCRIPTION OF THE INVENTION

Figure 1:
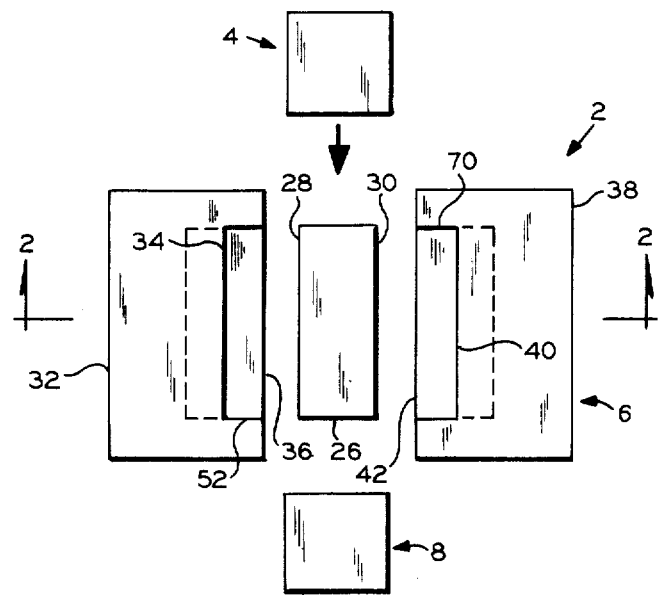
FIG. 1 is an elevation view schematically illustrating one embodiment of the present invention.

In one embodiment of the present invention, there is provided an apparatus illustrated generally by the reference numeral 2 which comprises a means 4 such as an extruder for extruding a molten tubular parison 74; a closeable mold illustrated generally by the numeral 6; and a means 8 for pinching closed one end of the tubular parison prior to closing the mold. The apparatus also comprises a means for pneumatically expanding the parison 74 prior to closing the mold. The pneumatic expanding means is generally a tubular member connected to a source of compressed gas, usually air, associated with the extrusion means 4 and/or the pinching means 8 so that compressed gas can be introduced into the inside of the parison once it has been closed up.

Figure 2:
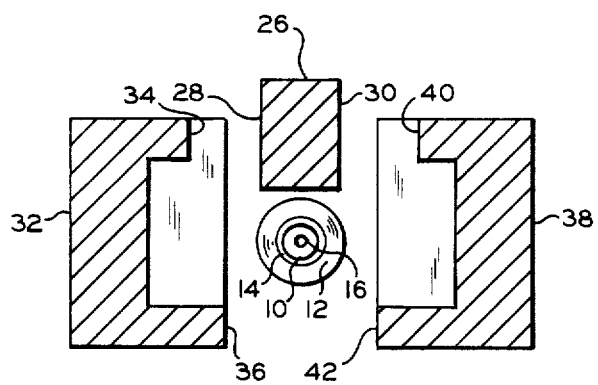
FIG. 2 is a cross sectional view looking upward of the apparatus taken along lines 2—2 of FIG. 1.

The means for extruding the parison 74 generally comprises a die 10 and ring 12 as best shown in FIG. 2 for example. The die or mandrel 10 is generally concentric to the ring 12 so that molten parison can be extruded through the annulus 14 between the die 10 and the ring 12 to form the tubular parison which then generally hangs vertically from the extruder means 4 to its desired position between the parts of the mold 6.

As the parison 74 drops, one end remains attached to the extrusion means 4. A second end of the parison 74 is pinched shut by the means 8 which can comprise a pair of bars which move together into a side by side relationship for example. Although the means 8 can be positioned above the mold 6, between the extruder 4 and the mold 6, to pinch closed the second end of the parison prior to its passage between the mold parts it is preferable that the means 8 be positioned beneath the mold 6 so that the second end of the parison 74 is pinched shut after a predetermined section or length of parison 74 has been extruded from the means 4.

Once the parison 74 has been positioned between the mold part and its second end pinched closed, the means for pneumatically expanding the parison prior to closing the mold can be actuated. In FIG. 2, the means for pneumatically expanding the parison 74 can comprise a nozzle 16 which communicates with the inside of the parison and is connected to a suitable source of compressed gas. If desired, the means for pneumatically expanding the parison could comprise a tube suitably connected to a source of compressed gas sticking up into the inside of the parison 74 between the bars forming the means 8. In any event, the means for pneumatically expanding the parison 74 should be connected to a source of compressed gas having a few pounds pressure, such as in the range of from about 1 to about 20 psig with sufficient volume of gas being available to expand the volume of the parison 74 in the range of say 10 to 100 percent.

Figure 6:
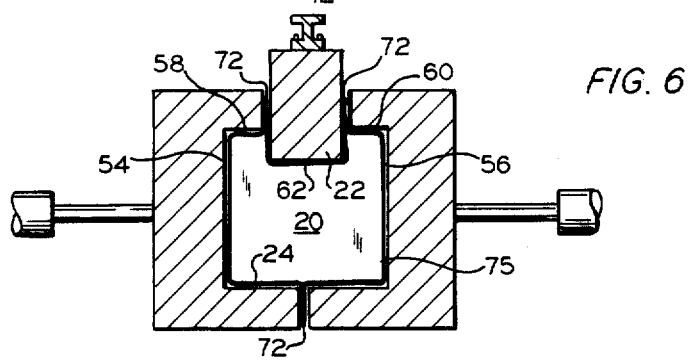

The closeable mold 6, when in the closed position, defines a chamber 20 as best shown in FIG. 6 which has at least one longitudinally extending rib 22 protruding inwardly from the sidewall 24 of the chamber. The chamber 20 is defined by a first mold part 26 which determines the rib 22. The first mold part 26 has a first face 28 and a second face 30. A second mold part 32 determines a first side portion of the chamber 20. The second mold part 32 has a first face 34 and a second face 36. A third mold part 38 determines a second side portion of the chamber 20. The third mold part 38 has a first face 40 and a second face 42. The first face 28 of the first mold part 26 matches with the first face 34 of the second mold part 32 and the second face 30 of the first mold part 26 matches with the first face 40 of the third mold part 38. Some of the faces are preferably provided with lips to provide a chamber for holding flash from the parison when the mold is closed. The mold 6 is further provided with a means for providing a closure between the second face 36 of the second mold part 32 and the second face 42 of the third mold part 38. Preferably, the means provided is the matching of the faces 36 and 42 to provide the closure although the closure could be in the form of another rib, such as one similar to the rib 26 if desired.

Figure 3:
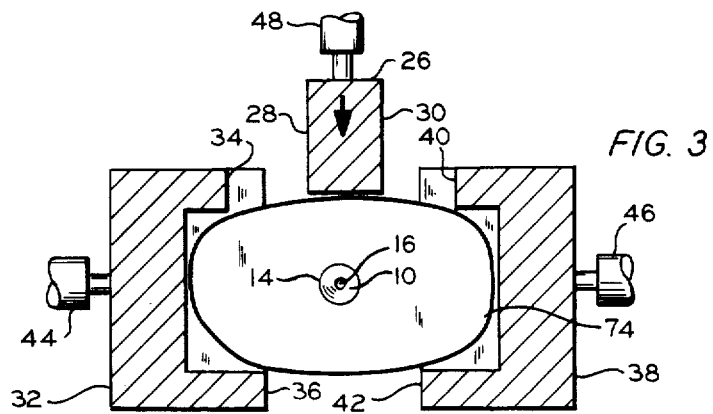
FIG. 3 is a view as in FIG. 2 showing certain additional features of certain aspects of the present invention.
Figure 4:
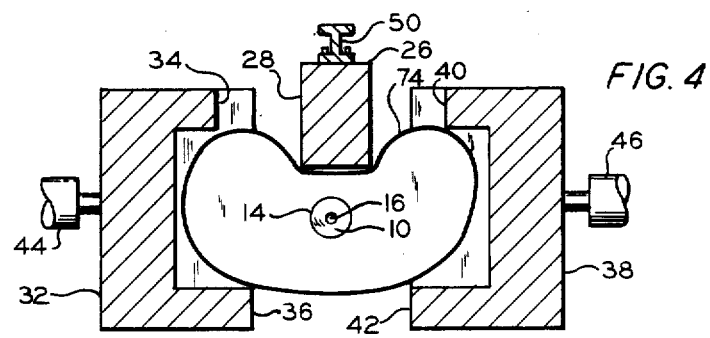
FIGS. 4, 5, and 6 are cross-sectional representations when viewed along lines 2—2 of the apparatus of FIG. 1 showing certain processing steps according to one embodiment of the present invention.
Figure 5:
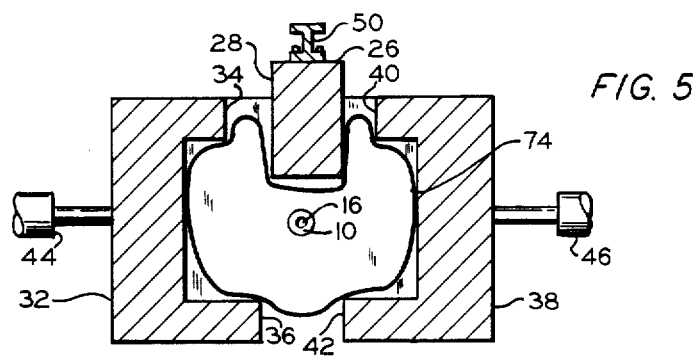

With reference to FIG. 3, the apparatus is further provided with a means 44 such as a hydraulic cylinder for moving the second mold part 32 into a position so that the first face 34 matches with the first face 28 of the first mold part 26. Also, a means 46 such as a hydraulic cylinder is provided for moving the third mold part 38 into a position so that the first face 40 of the third mold part matches the second face 30 of the first mold part 26. In certain embodiments, there is contemplated a means 48 such as a hydraulic cylinder for moving the first mold part 26 into a position so that its first face 28 matches with the first face 34 of the second mold part 32 and its second face 30 matches with the first face 40 of the third mold part 38. However, the means 48 is generally believed to be unnecessary, at least where the inward fold is to be of relatively shallow depth and has been replaced by a means 50 in FIGS. 4 through 6 comprising an I-beam fixedly supported and rigid, for example, for fixedly mounting the first mold part 26 with respect to the means for extruding the molten tubular parison.

Generally, the mold 6 will form a shell-shaped cavity for forming hollow blow molded articles. Many blow molded articles are somewhat box shaped and for forming these articles, the mold 6 in the closed position will define a generally box shaped cavity with the rib 22 extending generally longitudinally along one side of the box and protruding inwardly. For many purposes, the box will be somewhat elongated and the rib will lie along the longitudinal dimension of the box. For many applications, the box-shaped cavity will have a width which is measured from the side of the box from which the rib 22 protrudes to the side opposite from the rib 22, a length which is measured at a right angle to the width from a side which defines a top 70 of the cavity to the side which defines a bottom 52 of the cavity, and a thickness preferably less than the width such as in the range of 0.05 to 0.5 times the width measured orthogonal to the length and the width from a side 54 on one side of the rib to a side 56 on the other side of the rib. Generally, the rib 22 will protrude into the cavity in the range of from about 0.02 to about 0.25 times the width and the rib will have a thickness measured in the same direction as the thickness of the cavity which is in the range of from about 0.1 to about 0.9 times the thickness of the box-shaped cavity so that a blow molded article 75 formed in the mold will have double-walled legs 58 and 60 on each side of the fold 62 formed by the rib.

Preferably, the first mold part 26 is positioned along the parting line of the mold centered on the longitudinal axis of the parison 74. Both mold portions 32 and 38 preferably are completely disengaged from the first mold portion 26 although they can be attached to it by means of slides which allow the rib to remain in a relatively neutral position. To insure good wall distribution of the plastic material, it is desirable that the first face 28 of the first mold portion 26 meets the first face 34 of the second mold portion 32 along a first side of the rib. The second face 30 of the first mold portion 26 should meet the first face 40 of the third mold portion 38 along a second side of the rib. The second face 36 of the first mold portion 32 should meet the second face 42 of the third mold portion 38 along a side of the box-shaped cavity which is generally opposite from the rib 22. Wall distribution is further enhanced by pinching portions of the parison 74 between the matched faces of the mold parts to form flash 72 as shown in FIG. 6.

According to certain other aspects of the present invention, there is provided a method for blow molding a plastic article 75 from a parison 74. The method is advantageous for forming articles having inward protrusions because it provides good wall thickness allowing for reduction of weight in the finished article with good results. The method comprises extruding a molten parison 74 from between a die and a land along the side of an elongated rib where the rib is to be positioned along the parting line of a pair of mold parts, the rib and pair of mold parts in combination forming a chamber having an inwardly protruding rib. The open end of the parison is pinched shut. As stated before, this can be before or after it is extruded alongside the elongated rib. The parison is then pneumatically expanded partially around the elongated rib. See FIG. 4. The rib forms an inwardly projecting fold or inwardly directed indentation in the parison. If desired, the rib can be actuated to move into the side of the parison. The mold parts are then moved into contact with the elongated rib and because of the pneumatic expansion, or pre-expansion as the term is known to the art, a flash line of the parison will be pinched between the elongated rib and the mold parts. See FIGS. 5 and 6. The pre-expansion preferably occurs at a relatively low pressure such as in the range of from about 1 to about 20 psig and the parison is expanded from about 10 percent to about 100 percent of its original volume. Once the mold is closed, the parison is pneumatically expanded inside of the mold by a pressure applied to its inside to fit the chamber which is defined by the mold parts and the elongated rib. This second expansion preferably occurs at a much higher pressure than the first, such as in the range of from about 10 to about 100 psig. Polyethylene is the preferred material for making articles according to the invention. For example, polyethylene would be very desirable to form parts for use in appliances or automobiles and the like. Suitable resins are shown in Table I.

TABLE 1

| Designation* | Type | Density | Melt Index |
| --- | --- | --- | --- |
| Marlex TR-140 | Ethylene hexene copolymer | 0.947 | 0.30 |
| Marlex TR-140 | Ethylene hexene copolymer | 0.939 | 0.30 |
| HHM-4903 | Ethylene hexene copolymer | 0.949 | 0.30 |
| HHM-5202 | Ethylene hexene-1 copolymer | 0.951 | 0.35 |

*Resins listed are manufactured and sold by Phillips Chemical Company of Bartlesville, Oklahoma.

The invention is illustrated by the following example.

EXAMPLE

A refrigerator chamber member about 23 inches wide by 29 inches long by 2½ inches deep having an inward folded rib 1½ inches wide by ¾ inches deep along one end on the 29 inch dimension was molded from Marlex TR-140 on a Hartig Model MR4 blow molding machine. The first mold part was a stationary bar attached to an I-beam supported in a rigid structure and positioned along the parting line at one end of the mold. The center line of the mold was offset from the center of the die in the opposite direction 2.9 inches. The mold was supported 13 inches below the face of the die with the pinch bars set 5 inches below the bottom of the mold. A shaped die was used having an outlet diameter of 11.9 inches. The pre-expansion of the mold when closed by the pinch bars was provided by one second of low pressure air at 10 psi. Stock temperature was 362° F. Blow air at 80 psi was directed through a blow pin in the bottom of the mold. Total cycle time was 3 minutes 25 seconds. Part weight after trimming was 4.3 lbs. The finished part had substantially equal wall distribution with no ruptures or blowouts and substantially no warpage. Previous attempts to make an article of the same configuration required substantially more resin and could not be made without ruptures in the corner areas, had uneven wall distribution, and exhibited warpage.

What is claimed is:

1. Apparatus comprising
  a means for extruding a molten tubular parison from between a die and a ring into a closeable mold, said tubular parison to have a first end attached to said means and a second end;
  a means for pinching closed the second end of the tubular parison prior to closing the mold;
  a means for pneumatically pre-expanding the parison prior to closing the mold;
  said closeable mold, when in the closed position, defining a chamber with at least one longitudinally extending rib protruding inwardly from the sidewall of the chamber in the range of from 2 to about 25 percent across the chamber;
  said closeable mold comprising a first mold part which determines the rib, said first mold part having a first face and a second face;
  a second mold part which determines a first side portion of the chamber, said second mold part having a first face and a second face; and
  a third mold part which determines a second side portion of the chamber, said third mold part having a first face and a second face;
  the first face of the first mold part matching with the first face of the second mold part and the second face of the first mold part matching with the first face of the third mold part;
  a means for providing a closure between the second face of the second mold part and the second face of the third mold part;
  a means for moving the second mold part into a position so that the first face of the second mold part matches with the first face of the first mold part; and
  a means for moving the third mold part into a position so that the first face of the third mold part matches the second face of the first mold part.

2. Apparatus as in claim 1 wherein the first mold part is fixedly mounted with respect to the means for extruding the molten tubular parison.

3. Apparatus comprising
  a means for extruding a molten tubular parison from between a die and a ring into a closeable mold, said tubular parison to have a first end attached to said means and a second end;
  a means for pinching closed the second end of the tubular parison prior to closing the mold;
  a means for pneumatically pre-expanding the parison prior to closing the mold;
  said closeable mold, when in the closed position, defining a chamber with at least one longitudinally extending rib protruding inwardly from the sidewall of the chamber in the range of from 2 to about 25 percent across the chamber;
  said closeable mold comprising a first mold part which determines the rib, said first mold part having a first face and a second face wherein the first mold part is fixedly mounted with respect to the means for extruding the molten tubular parison;
  a second mold part which determines a first side portion of the chamber, said second mold part having a first face and a second face; and a third mold part which determines a second side portion of the chamber, said third mold part having a first face and a second face;

the first face of the first mold part matching with the first face of the second mold part and the second face of the first mold part matching with the first face of the third mold part wherein the second face of the second mold part matches with the second face of the third mold part to provide a closure between the second mold part and the third mold part;

a means for moving the second mold part into a position so that the first face of the second mold part matches with the first face of the first mold part; and a means for moving the third mold part into a position so that the first face of the third mold part matches the second face of the first mold part.

4. Apparatus as in claim 1 wherein the second mold part and the third mold part define generally shell-shaped cavities.

5. Apparatus as in claim 1 wherein the mold when in the closed position defines an elongated generally box-shaped cavity with the rib extending generally longitudinally along one side of the box and protruding inwardly.

6. Apparatus as in claim 5 wherein the first face of the first mold part meets the first face of the second mold part along a first side of the rib, wherein the second face of the first mold part meets the first face of the third mold part along a second side of the rib, and wherein the second face of the second mold part meets the second face of the third mold part on the side of the box-shaped cavity opposite from the rib.

7. Apparatus as in claim 6 wherein the box-shaped cavity has a width measured from the side from which the rib protrudes to the side opposite from the rib, a length measured at a right angle to the width and from a side which defines the top of the cavity to the side which defines the bottom of the cavity, and a thickness measured orthogonal to the length and the width from a side on one side of the rib to the side on the other side of the rib, wherein the rib protrudes into the cavity in the range of about 0.02 to about 0.25 times the width and has a thickness in the range of about 0.1 to about 0.9 times the thickness of the box-shaped cavity, so that a blow-molded article formed in the mold will have double-walled legs on each side of a fold formed by the rib.

8. A method for blow molding a plastic article from a parison comprising extruding a molten tubular parison along the side of an elongated rib, said rib to be positioned along the parting line of a pair of mold parts to form a chamber having an inwardly protruding rib extending partway thereacross and then pinching shut the open end of the parison;

thereafter pneumatically expanding the parison partially around the elongated rib;

then moving the mold parts into contact with the elongated rib while pinching a flash line of said parison between the elongated rib and the mold parts; and pneumatically expanding the inside of the parison to fit the chamber defined by the mold parts and the elongated rib.

9. A method as in claim 8 further comprising moving the elongated rib into the side of the parison to form an inward fold in the parison prior to contacting the mold parts with the elongated rib.

10. A method as in claim 9 wherein the parison is formed from polyethylene.

* * * * *